Patented Feb. 16, 1954

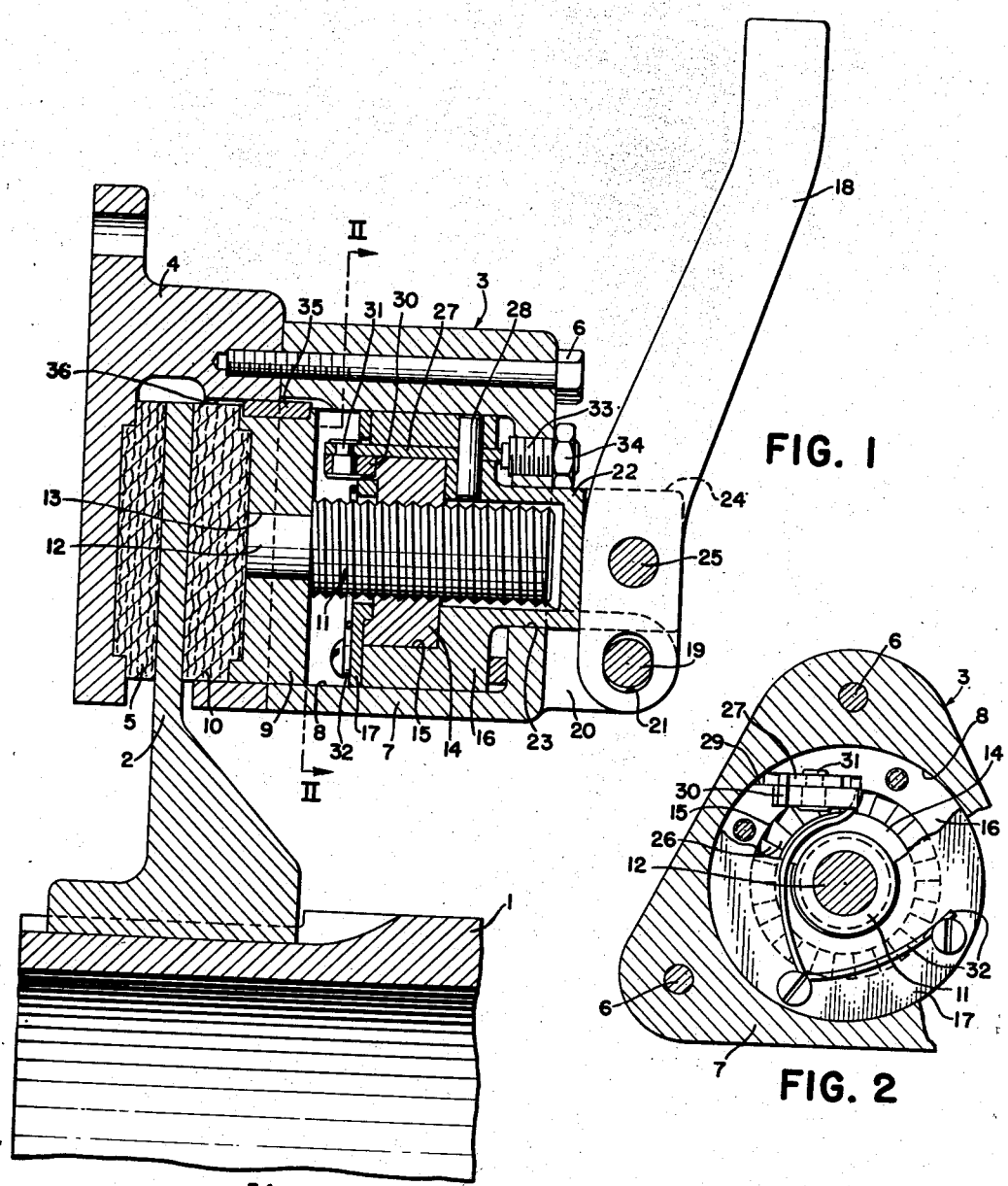

2,669,327

UNITED STATES PATENT OFFICE 2,669,327

AUTOMATIC CLEARANCE ADJUSTING MECHANISM FOR SINGLE-DISK, SPOT-TYPE BRAKES

Richard K. Chamberlain and Kenneth P. Hillegass, Akron, Ohio, assignors, by mesne assignments, to The Goodyear Tire & Rubber Company, a corporation of Ohio Application August 23, 1951, Serial No. 243,336

4 Claims. (Cl. 188—72)

This invention relates to an automatic adjusting mechanism for a brake, and, more particularly, to a mechanism which maintains the clearance between the braking surfaces within predetermined limits regardless of the wear of the lining or other friction material of the brake.

One difficulty encountered in the operation of a single-disc, spot-type brake is the rather frequent adjustments required to compensate for wear of the friction material. Because the area of the friction material in contact with the brake disc is considerably less than in the conventional drum-type brake, and even though the disc type brake normally has better cooling characteristics, the rate of wear of the friction material on a disc brake is somewhat accelerated. It is therefore usually desirable that some sort of automatic adjusting mechanism be used to maintain the clearance between the braking surfaces within proper operating limits throughout the life of the friction material. Furthermore, because the total adjustment over a period of time may be considerable, for example, of the order of ¼" to ¾", it is desirable that the clearance adjustment be made independently of the mechanical or hydraulic brake-actuating system.

Automatic adjusting mechanisms proposed and employed in the prior art have generally required the repositioning of the hydraulic piston actuating the brake. In such arrangement, as the brake lining wears away, the position of the piston within the hydraulic cylinder is shifted accordingly. Such an arrangement is somewhat undesirable in a single-disc, spot-type brake because the hydraulic cylinder has to be made extra long to permit the full range of adjustment necessary.

It is the general object of this invention to avoid and overcome certain of the foregoing and other difficulties in and objections to the prior art practices by the provision of automatic adjusting means for a single-disc, spot-type brake which is positive acting, rugged, foolproof, and inexpensive to manufacture.

Another object of this invention is to provide an automatic adjustment mechanism for brakes which maintains the clearance between the braking surfaces within predetermined limits over the life of the lining material.

Another object of this invention is the provision of an automatic adjusting mechanism which is capable of operating over relatively large limits of adjustment.

Another object of this invention is to provide automatic brake-adjusting means which adjusts on the return stroke of the brake actuating means.

Another object of this invention is the provision of a mechanism for adjusting brake clearance in which the braking forces are not carried by the adjusting parts.

Another object of this invention is to provide an automatic adjustment for a brake or the like in which the adjustment is made between the brake shoe and the brake actuating mechanism.

These and other objects of the invention which will become apparent as the description proceeds are achieved in a brake assembly by a screw adjustment between the brake shoe and the brake actuating means, the latter being in the form of either an hydraulic piston or a mechanically actuated lever means. An adjusting nut rotatably carried by the brake-actuating means threadably engages an adjusting screw secured to the brake shoe. The adjusting nut is provided with ratchet notches on one face thereof which are engaged by a pawl and lever unit carried by and movable with the brake-actuating means. As the brake actuating means is moved to apply a braking pressure to the brake shoe, movement thereof actuates the lever and associated pawl. As the friction material wears, increasing the stroke of the brake-actuating means, attendant movement of the lever and pawl is such that the pawl drops into successive notches on the adjusting nut. Each time the pawl engages a successive notch, the return stroke of the brake-actuating means causes the lever and pawl unit to rotate the adjusting nut slightly, thereby gradually feeding the brake shoe toward the brake disc to compensate for the wear of the friction material.

For a better understanding of the invention, reference should be had to the accompanying drawings, wherein:

Fig. 1 is a cross-sectional view of one embodiment of the invention showing the adjusting mechanism and associated brake;

Fig. 2 is a fragmentary cross-sectional view taken substantially on the line II—II of Fig. 1; and Fig. 3 is a partial view, partly in section, showing details of the lever and pawl unit.

With specific reference to the form of the invention illustrated in the drawings, the numeral 1 indicates generally a rotating shaft or axle on which is carried a brake disc 2. The disc is preferably splined to the shaft to permit axial movement of the disc.

The brake mechanism, indicated as a whole at 3, includes a main supporting bracket 4 which is suitably anchored to the housing (not shown) rotatably supporting shaft 1. The supporting bracket 4, as in spot-type, single-disc brakes is of a C-shape and extends on either side of the disc 2 and has a plug of friction material riveted or otherwise secured thereto which is adapted to engage with one face of the disc 2. Secured to the support bracket 4, as by bolts 6, is a housing 7 which has a cylinder bore 8 extending through a substantial portion of the housing. When the housing 7 is bolted in position, the bore 8 is in exact alignment with a bore of the same diameter extending through the support bracket 4 opposite the disc 2.

Slidably carried within the bore 8 is the brake plunger or shoe 9 on which is secured a plug of friction material 10. The plug 10 is adapted to engage the brake disc 2 in opposed relationship to the plug 5. Movement of the plunger 9 towards the disc 2 squeezes the disc between the two plugs of friction material to apply braking action.

To transmit the brake pressure to the plunger 9 and at the same time to provide means for adjusting the spacing between the plunger 9 and brake-actuating means, an adjusting screw 11 is axially secured to the back of the plunger 9 in any suitable manner, such as providing a press fit between a shank portion 12 of the adjusting screw and a hole 13 in the plunger. Threadably engaging the adjusting screw 11 is an adjusting nut 14 having a circular outer periphery which slidably engages a counterbored hole 15 in the cup-shaped, nut holder or member 16. A retainer plate 17, secured to the end of the member 16, retains the nut 14 within the counterbore 15. Thus, movement of the member 16 is transmitted through the nut 14 to move the adjusting screw 11 and plunger 9. The entire braking force is thus transmitted through the strong and relatively heavy threaded engagement between the nut 14 and the adjusting screw 11.

Any suitable means may be employed to apply braking force to the member 16, such as a hydraulic motor means or mechanical lever means. The mechanical linkage, indicated in Fig. 1, includes a lever 18 which is pivotally supported on the housing 7 by means of a pin carried between bifurcated lugs 20 integrally secured to the housing 7, the pin 19 extending through a slotted opening 21 at one end of the lever 18. An axial stem-like extension 22 of the member 16 passes through an opening 23 in the end of the housing 7, the extension 22 having a pair of fork-like lugs 24 which extend on either side of the lever 18 and are pivotally secured thereto by a pin 25 passing through a hole in the lever 18. It will be evident that a force applied to the outer end of the lever 18 in a direction tending to move the lever to the left as viewed in Fig. 1 will apply a braking force to the plunger 9.

An important feature of the invention is to provide suitable automatic adjusting means between the plunger 9 and the member 16 to compensate for wear of the friction plugs 5 and 10, so that the stroke of the lever 18 and associated member 16 is substantially the same throughout the life of the friction material. To this end, the adjusting nut 14 is provided with an endless ring of laterally directed ratchet teeth 26 around its periphery.

An adjusting lever 27 is pivotally secured by means of a pin 28 to the member 26, the lever 27 being positioned in a slot 29 which is substantially tangential to the counterbore 15. A pawl 30 is pivotally secured by means of a pin 31 to the outer end of the adjusting lever 27 and is adapted to engage the ratchet teeth 26. The pawl is held in engagement with the ratchet teeth by means of a wire spring 32 which is anchored to the plate 17, as particularly shown in Fig. 2. The wire spring 32 performs the dual function of urging the pawl 30 into engagement with the ratchet teeth 26 and also of tending to rotate the adjusting lever and pawl unit about the pin 28 thereby holding the adjusting lever 27 against a stop 33. The stop 33 is in the form of an adjustable screw which is threadably secured to the housing 7. A lock nut 34 is provided to secure the stop in proper position. The stop 33 is positioned off center relative to the pivot pin 28 so that the braking movement of the member 16 causes the adjusting lever 27 to turn through a small angle about the pivot point 28 by the action of the wire spring 32.

More specifically, operation of the automatic adjustment feature of the invention is as follows:

As the member 16 is moved towards the brake disc 2 when brake pressure is applied, the adjusting lever 27 is rotated through a small angle in a clockwise direction as viewed in Fig. 3 under the action of the wire spring 32. Thus, the pawl 30 tends to climb up the sloping face of the associated ratchet tooth 26. It will be evident that as the friction plugs 5 and 10 wear, movement of the member 16 is gradually increased upon repeated braking actions until the movement is such that the pawl 30 drops into the adjoining ratchet tooth. When this occurs, as the braking pressure is relieved and the member 16 backs off (for example, under the action of a return spring on lever 18), the stop 33 pivots the adjusting lever 27, causing the adjusting nut 14 to rotate one ratchet tooth. A key 35 secured to the plunger 9 slides in a key slot 36 to prevent rotation of the plunger. By proper design of the pitch of the rotation of the adjusting nut 14 by the lever and pawl unit causes the plunger to advance a sufficient amount to compensate for the wear of the friction plugs.

From the above description, it will be evident that the original lining clearance is maintained and kept to a minimum over the life of the friction material. Furthermore, adjustment takes place only on the return stroke of the member 16 and associated plunger 9 and is therefore made at a time when no load is on the brake. In addition, the entire braking force is transmitted through the adjusting nut 14 but not through the adjusting lever and pawl unit, with the result that the brake assembly is very rugged and gives a positive braking action. While the adjusting mechanism has been particularly described in connection with a single-disc, spot-type brake which is mechanically actuated, it is to be understood that the principles of the invention are applicable as well to a hydraulically-actuated brake.

While in accordance with the patent statutes, one best known embodiment of the invention has been shown and described in detail, it is to be particularly understood that the invention is not limited thereto or thereby, but that the inventive scope is defined in the appended claims.

We claim:

1. A brake assembly including a stationary member, a rotary member, a hollow cylindrical housing secured to the stationary member, a plunger slidably carried in the housing, a plug of frictional material secured to the plunger and adapted to frictionally engage the rotary member, an adjusting screw secured to the plunger and extending axially of the cylinder housing, an adjusting nut threadably engaging the screw, the adjusting nut having ratchet teeth formed on one face thereof, a cylindrical nut-holding member slidably carried within the housing, the adjusting nut being rotatably supported but axially secured to the nut-holding member, an adjusting lever pivotally carried by the nut-holding member, a ratchet pawl pivotally secured to the lever and adapted to engage the ratchet portion of the adjusting nut, an adjustable stop associated with the housing and adapted to engage the adjusting lever, spring means secured to the nut-holding member and engaging the pawl for holding the pawl in engagement with the ratchet portion of the adjusting nut and the associated adjusting lever in engagement with the stop, and brake actuating means for moving the nut-holding member axially of the housing to apply braking pressure between the plug and rotary member.

2. A brake assembly including a stationary member, a rotary member, a hollow cylindrical housing secured to the stationary member, a plunger slidably carried in the housing, a plug of frictional material secured to the plunger and adapted to frictionally engage the rotary member, an adjusting screw secured to the plunger and extending axially of the cylindrical housing, an adjusting nut threadably engaging the screw, the adjusting nut having ratchet teeth formed on one face thereof, a cylindrical nut-holding member slidably carried within the housing, the adjusting nut being rotatably supported on but axially secured to the nut-holding member, pawl means pivotally carried by the nut-holding member and adapted to engage the ratchet portion of the adjusting nut, an adjustable stop associated with the housing and adapted to engage the pawl means, spring means secured to the nut-holding member and engaging the pawl means to hold said means against the ratchet and stop, and brake actuating means for moving the nut-holding member axially of the housing to apply braking pressure between the plug and rotary member.

3. A brake assembly including a stationary member, a rotary member frame means secured to the stationary member, a plunger slidably carried by said frame means, a plug of frictional material secured to the plunger and adapted to frictionally engage the rotary member, an adjusting screw secured to the plunger, an adjusting nut threadably engaging the screw, the adjusting nut having ratchet teeth formed on one portion thereof, a nut-holding member movably supported by the frame means, the adjusting nut being rotatably supported but axially secured to the nut-holding member, pawl means pivotally carried by the nut-holding member, and adapted to engage the ratchet portion of the nut, an adjustable stop associated with the frame means and adapted to engage the pawl means, spring means secured to the nut-holding member and engaging the pawl means to hold said means against the ratchet portion of the nut, and brake actuating means for moving the nut-holding member axially of the frame means to apply braking pressure between the plug and rotary member.

4. A brake assembly including a stationary member, a rotary member, frame means secured to the stationary member, a plunger slidably carried by said frame means and adapted to frictionally engage the rotary member, an adjusting screw secured to the plunger, an adjusting nut threadably engaging the screw, the adjusting nut having ratchet teeth formed on one surface thereof, a nut-holding member movably supported by the frame means, the adjusting nut being rotatably secured to the nut-holding member, pawl means pivotally carried by the nut-holding member and adapted to engage the ratchet surface of the nut, a stop associated with the frame means and adapted to engage the pawl means, spring means to rotate the nut when the plunger is in non-braking position secured to the nut-holding member and engaging the pawl means to hold said means against the ratchet surface, and brake actuating means for moving the nut-holding member axially of the frame means to apply braking pressure between the plug and rotary member.

RICHARD K. CHAMBERLAIN.
KENNETH P. HILLEGASS.

References Cited in the file of this patent

UNITED STATES PATENTS

| Number | Name | Date |
|---|---|---|
| 2,106,167 | Colman | Jan. 25, 1938 |
| 2,109,637 | Gutkaiss | Mar. 1, 1938 |
| 2,152,041 | Goepfrich | Mar. 28, 1939 |
| 2,196,799 | Keplinger | Apr. 9, 1940 |
| 2,264,454 | Para | Dec. 2, 1941 |
| 2,531,341 | Meador, Jr. | Nov. 21, 1950 |